June 25, 1935.  M. STONE ET AL  2,005,877
CONTROL MEANS FOR WELL DRILLING EQUIPMENTS
Filed Nov. 29, 1933  2 Sheets-Sheet 2

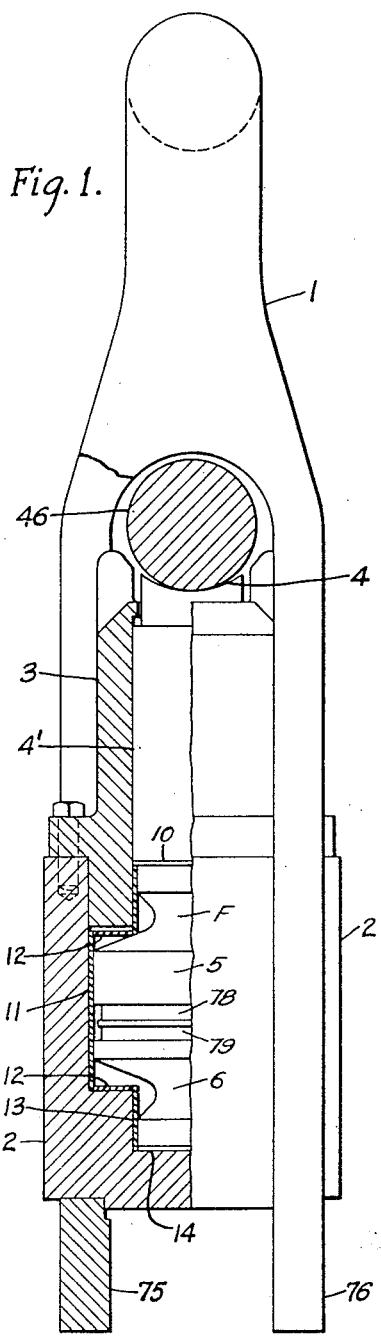

WITNESSES:
Leon J. Faza
Paul E. Friedemann

INVENTORS.
Morris Stone and
René A. Baudry.
BY
W. R. Coley
ATTORNEY

Patented June 25, 1935

2,005,877

UNITED STATES PATENT OFFICE 2,005,877

CONTROL MEANS FOR WELL DRILLING EQUIPMENTS

Morris Stone and René Baudry, Wilkinsburg, Pa., assignors to Westinghouse Electric & Manufacturing Company, East Pittsburgh, Pa., a corporation of Pennsylvania Application November 29, 1933, Serial No. 700,314

9 Claims. (Cl. 255—19)

This invention relates to a weighing device and to a well-drilling system controlled thereby, said device having particular utility for weighing the drill stem for deep well-drilling equipments or similar bodies having great weight, as well as to the means for controlling the operation of such equipments.

Attempts have been made to indicate or measure the weight of objects such as oil well drilling strings, by the provision of devices utilizing helical springs or other springs of similar character. However, such devices, when great weights are to be measured, are heavy, inaccurate, complicated, and expensive.

One of the objects of our invention is to provide a simple, compact, relatively small, practical, inexpensive, and, above all, accurate means for measuring the weight of relatively heavy objects.

Another object of our invention is to provide for accurately weighing great weights so that a variation of a small fraction of percent of the total weight being weighed is accurately indicated.

Various other attempts have been made with devices of the prior art to control the hoisting motor of a deep well drilling system as a function of the load of the drilling motor in drilling the strata upon which the bit operates. To this end, tension responsive devices cooperating with a cable have been mounted at the dead end of the cable. Such practice has not proven successful commercially. From the forces involved, it is obvious that such devices must be unsatisfactory, because scientific tests have shown that the tension in the shank of the hook supporting the drill stem may vary over a range of 5000 pounds without any variation in the tension of the cable at the dead or fixed end. To take measurements and to actuate control devices from operating characteristics in the cable at the fixed end may possibly provide a simple and cheap device, but if such measurements are in error by a value much greater than the value to be controlled, then such control devices are clearly unsatisfactory from the standpoint of accuracy and reliability.

In working on the invention herein presented, we were fully apprised of the problem and, therefore, as an object of this invention the provision of a simple, practical, inexpensive, and, above all, accurate system of control whereby the drilling motor is not overloaded, crooked holes are avoided, broken and twisted drill stems are prevented, and the drilling operation proceeds with a maximum of speed at which a given formation may be properly drilled.

It is, furthermore, an object of this invention to control the feeding of the drill stem as a function of the pressure or weight of the drill stem on the bottom of the well, that is, on the strata being drilled.

Another object of this invention is to control the feeding of the drill stem in response to operations of an electro-mechanical weighing device disposed directly in a supporting hook for the drill stem.

Another object of this invention is to provide for automatically retrieving the drill stem when the weight of the drill resting on the bottom of the well exceeds a predetermined value.

Other objects and advantages of this invention will become apparent from a study of the following specification when taken in conjunction with the accompanying drawings, in which:

Figure 1 is a side view, partly in section, of our weighing device and of a bail for supporting the drill stem and also providing a mounting for the weighing device;

Fig. 2 is an enlarged vertical section of the flask portion of the weighing device with a major portion of the micarta housing removed;

In the art of deep well drilling, the weights involved may amount to several hundred thousand pounds, whereas in practice the average weight of the drill tool on the bottom of the well is in the neighborhood of 8,000 pounds and may even be considerably less. Furthermore, a variation of 5,000 pounds may cause the drill stem to jam and be twisted off. Yet a variation of 5,000 pounds, where, say 250,000 pounds are involved, is but a relatively small variation. Any ordinary device for weighing the drill stem is thus of little value in the art, and the necessity for an accurate and reliable device is clearly evident.

Figure 5:
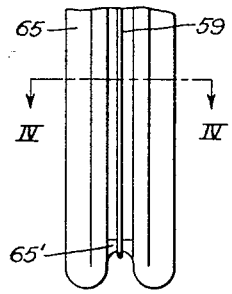
Fig. 5 shows a well drilling system utilizing our invention for controlling the operation of the drill.

In Fig. 5 this invention is shown in combination with a deep well drilling equipment of the rotary type. This type of drilling equipment includes a drill stem 36, a drill table 35 and a motor 33 for driving the drill table. The hoisting equipment includes a hoist drum 39 driven by a motor 38 and a cable 40 cooperating with the crown block 41 and the travelling block 42. The novel weighing device is disposed directly between the drill stem and the travelling block by being positioned on the hook 44 and the stem suspending the U-shaped member 49.

Referring more particularly to Fig. 1, reference character 1 designates a bail or elliptical hoop terminating in a bifurcated portion having loops 75 and 76 for supporting the housing 2 for the receptacle or flask F which is to be subjected to the weight of the drill stem. The housing 2 is provided with guide members 3 for guiding the upper or stem portion 4' of the flask F. The upper end of the stem portion 4' is provided with a bearing surface 4 upon which the pin, or beam member 46 rests in such a manner as not to engage the guide members 3. The flask F is housed in a suitable "micarta" or insulating housing consisting of the portions 9, 10, 11, 12, 13 and 14.

The insulating housing referred to consists of a cylindrical member 9 about the stem 80, a washer-like compression member 10 disposed between the diaphragm 5 and the stem portion 4'. A pair of cylindrical members 13 and a cylindrical member 11 cooperate with the washer-like members 12 and the plate-like member 14 to complete the housing. The material of the insulating housing may be any suitable fibrous material but it is preferably constructed of micarta. The purpose of the insulating housing is to minimize and dampen out the effect upon the flask of rapid changes of ambient temperature. The control of the drilling operation is obviously to be independent of the temperature effect and in the absence of the insulating housing it may happen that the diaphragms 5 and 6 are more rapidly effected by ambient temperature than the elements 7 and 8, and the mercury in the flask, which elements and liquid are more centrally located.

The bottom portion of the flask or the lower diaphragm or block 6 rests upon a sheet of "micarta" 14 interposed between the supporting housing 2 and the diaphragm member 6. The stem portion 4' of the flask F rests upon a micarta washer 10 interposed between the upper diaphragm 5 and the stem portion 4'.

The upper diaphragm or block 5 is provided with an extension or stem 80 having a small bore 80' extending from the top thereof through the bottom of the diaphragm 5. A resistor supporting rod 65 (see Figs. 2, 3, and 4) is disposed in the bore 80' of the stem 80, and is rigidly secured therein by means of a cap 66 and the nut and washer 64 and 67, respectively. The rod member 65 has a section, such as shown in Fig. 4, and may be passed through the cap 66 having a hexagonal hole corresponding to the section of the rod 65. By merely slightly turning the rod, the corners of the hexagonal portion of the rod engage the cap 66. The cap 66, mounted on the stem 80 as shown in Fig. 2, and the nut 64, thus provide a unitary structure for the resistor supporting rod 65.

Figure 3:
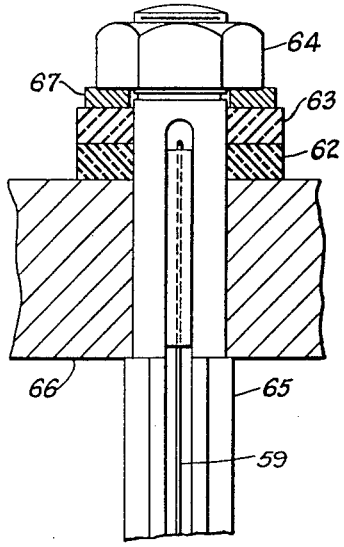
Fig. 3 is a detailed view of the resistor wire mounted in the flask or receptacle.
Figure 4:
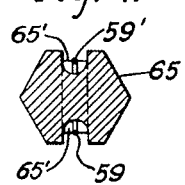
Fig. 4 is another detailed sectional view taken along line IV—IV of Fig. 3.

The resistor consists of a wire having two series-connected parallel conductors 59 and 59' disposed on the rod 65 in the manner indicated in Figs. 3 and 4, and the ends thereof are insulated from each other by the rubber washers 62 and 63. The lower portion of the stem 65 is provided with a spacing member 65' so as to accurately position the conductors 59 and 59' of the wire so that the wire, which is a bare wire, is not in contact with the frame of the flask.

The lower diaphragm 6 has the sectional configuration indicated in Fig. 2, having a relatively heavy annular bearing surface 81 for engaging the upper diaphragm member 5. A plurality of radial holes 82, or grooves, are cut in this bearing surface so that the cut-out portion 83 of the diaphragm 6 may be in communication with the chamber 84 formed between the two diaphragms. The two diaphragms are provided with the relatively thin portions 78 and 79, respectively, which are welded together by a bead 77, to provide a closed chamber 84 containing a liquid, preferably mercury.

Since an indicating device for indicating weight utilizing a liquid, particularly such as mercury, must take into account the variations in temperature of the device, we make provision to eliminate all temperature effects from the actual indication of the weight of the drill stem. To this end, the diaphragms 5 and 6 are so designed that a definite volume for a given temperature is provided by the chambers 83 and 84. Sheets of invar, such as 7 and 8, are placed in the chambers 83 and 84, respectively, to aid in providing an automatically compensated indicating device. Before assembling or positioning the rod 65 in the base 80', a number of steel balls are dropped into the tube 80 and float on the mercury in the chambers 83 and 84. The rod 65 is then inserted, depressing the steel balls to the position shown in Fig. 2. The purpose of the steel balls is to provide for accurate calibration without too accurate machining of the surfaces of the diaphragms to provide a given volume.

The volume of the chambers 83 and 84, minus a given volume of a number of steel balls, is so chosen that any variations of the volume due to changes in temperature may produce no rise nor fall of the level of the mercury in tube 80 with changes of temperature, provided the volume of mercury and the volume of the invar sheets are properly selected. For example, if a unit change in temperature increases the volume of the chambers 83 and 84 by one unit, then the volume of mercury relative to the volume of the invar sheets is so selected that the expansion of the mercury will just take up the increase in volume caused by the changes in dimension of the steel flask. This can be done because it is well known that the temperature coefficient of invar is extremely small, and can, for all practical purposes, be neglected.

When the stem portion 4' is subjected to the pressure of the drill stem 36 (see Fig. 5), the two diaphragms 5 and 6, engaging each other at the annular bearing surface 81, will be deflected towards each other at the center region, and the annular bearing surface, that is, the material itself, will be somewhat compressed, thereby decreasing the volume of the chamber 83, and thus extruding or causing a rise in level of the mercury contained in chambers 83 and 84. Since the conductors or wire portions 59 and 59' are bare conductors, the effective length of the conductors 59 and 59' in the circuit hereinafter described becomes less, and, in consequence, the effective resistance becomes less. As the mercury level rises more and more a greater and greater portion of the bare wires is short circuited. If the conductors 59 and 59' are interconnected with a suitable electric circuit an indication can be had of the exact weight acting on the stem 4', or the amount of variation of the weight supported on the stem 4'.

In Fig. 5, a system of control for a drilling equipment is shown, wherein the reference character 31 represents three buses for supplying the alternating current to the motors 33 and 38 through the control panel 32. Motor 33 drives the drill stem 36 disposed in the well 37 through the drill table 35 and the bevel gear 34.

The motor 38 operates the hoisting drum 39 through cable 40. The fixed end 43, the crown block 41 and the travelling block 42 through the operation of drum 39 control the vertical position of the drill stem 36.

The travelling block 42 is provided with a hook 44 carrying the bail or elliptical hoop 1. As heretofore explained, the weighing device is disposed in the lower portion of the bail 1. A pair of tension members 45 interconnect the pins 46 and 47. The pin 46 extends through the bifurcated portions 75 and 76 of the bail 1 and rests on the bearing surface 4 of the compression stem 4' of the weight-responsive device. The pin 47 is provided with a hook 48 engaging the U-shaped member 49 connected to the rotary bearing 50 of the drill stem 36. A suitable tube or base 51 leads to the mud pump for causing the flow of fluid into the well to remove the material that has been drilled away by the bit.

A battery 52 may be interconnected with the control panel through a weight indicating and control device 68. The battery 52 is provided with a variable resistor 53 for maintaining a constant voltage between the junctions 85 and 86. A permanent resistor 56 and a variable resistor 57 and the conductors 59 and 59' are connected in series between junctions 86 and 85. A pair of permanent resistors 54 and 55 are also connected in series between junctions 86 and 85, but are also connected in parallel circuit relation to the circuit just traced. The circuits traced thus provide a Wheatstone bridge arrangement. A weight indicating and drilling operation controlling device 68 is connected across the galvanometer junctions 87 and 88 of the Wheatstone bridge. The device 68 thus functions to indicate any unbalanced condition in the circuit due to any changes of the resistance values of the resistors shown. Since resistors 54, 55 and 56 are permanent resistors, the only unbalanced effect that may be accomplished is through the variable resistor 57 and the effective resistance value of conductors or wires 59 and 59'.

In operation, the drill stem 36 is lowered into the well 37 and all the sections of the stem are connected such that the bit is suspended but a short distance from the bottom of the well. Under these conditions, the entire weight of the drill stem is supported by the flask F and the mercury in the aperture 80' is extruded from the chambers 83 and 84 a maximum amount, thereby decreasing the effective resistance value of the conductors 59 and 59' to a minimum. Since the device 68 is connected across the galvanometer junctions 87 and 88, an unbalanced state is, of course, provided, and the pointer 72 is in some position other than the zero position.

In the drilling operation, it is not nearly as important to know the total weight of the drill stem as it is to know the pressure of the bit at the bottom of the well. The attendant, therefore, adjusts rheostat 57 so that the pointer 72 indicates zero weight when, in fact, the entire weight of the drill stem is supported by the flask F. The indicating and controlling device 68 thus operates, so to speak, backwardly, namely, indicating the amount that is subtracted from the total weight suspended when a portion of the drill stem is supported on the bottom of the well. In other words, the indicator indicates the weight of the stem resting on the bottom of the well. It is important, however, to know, in terms of pounds or thousand pounds, just what the weight is, and in consequence the attendant lowers the drill stem by suitable manipulation at the control panel 32 so that the pointer 72 indicates, say, 6000 pounds at 71 on the scale 69. To maintain a 6000 pound pressure at the bottom of the well, the control system must obviously respond to either a decrease in such weight or an increase in such weight. The attendant thereupon shifts the movable contact carrying member 70 to such a position that the contact member 72' mounted on the conducting pointer 72 is intermediate contact fingers 73 and 74. For the assumption made, the contact carrying member 70 will be shifted toward the right or in a clockwise direction until the point midway between contact members 73 and 74 is radially disposed with reference to the scale indication at 71. The pointer 72 will thus indicate 6000 pounds, yet the contact member 72' will make contact with neither of the contact fingers 73 and 74.

The automatic drilling operation may then proceed. If, for any cause, the pressure on the bottom of the well becomes too small, as it normally would when the strata is being drilled away, contact members 72' will make contacts successively with the two circumferentially disposed contact members 73. When engaging the first of the contact members 73, the motor 38 will be caused to operate to lower the drill stem until the proper weight on the bottom of the well is again obtained, at which point the contact members 72' will again make no contact with any of the contact fingers, and the motor will stop. If the lowering of the drill stem is too slow, the contact member 72' will, of course, move in the counter-clockwise direction through a greater angle, thus making contact with the second of the contact fingers 73, whereupon the motor 38 will be operated to lower the drill stem at a greater speed.

If the reverse is true, from the assumptions heretofore made, that is, for some cause or other the load on the drilling motor 33 becomes excessive because of an excessive weight on the bottom of the well, the contact member 72' will successively engage the circumferentially disposed contact fingers 74. When engaging the first one, the lowering of the drill stem is stopped by the motor 38 and the control may be such that a slow retrieval is effected. However, if the retrieval be too slow, the contact member 72' will, of course, engage the second contact finger 74 and a rapid retrieval is thus effected for the drill stem 36.

The foregoing specification not only describes a simple and accurate weighing device, but also shows this weighing device in combination with a well drilling system and control circuits for controlling the drilling operation so that a minimum of attention is needed on the part of the attendant.

It is readily apparent that those skilled in the art, after having had the benefit of the teachings contained in the foregoing disclosure, may devise certain other indicating and measuring and controlling means falling within the spirit of this invention. This invention is, therefore, not to be limited to the specific details contained in the foregoing specification and illustrated in the accompanying drawings, but it is to be limited only by the pertinent prior art and the scope of the claims appended hereto.

We claim as our invention:

1. A rotary well-drilling system, comprising a drill stem, in combination with, a weighing device including a receptacle containing a liquid, a passage extending from the receptacle and into which the liquid may be extruded when the receptacle is deformed, means for subjecting the receptacle to the weight of the drill stem whereby the receptacle is deformed, and means responsive to the amount of liquid extruded from the receptacle to control the operation of the drill stem.

2. A rotary well-drilling system, comprising a drill stem, a hoist drum, in combination with, a weighing device, including a flask-like structure having a base and stem containing a liquid, means for subjecting the flask to the weight of the drill to compress the flask, and means responsive to variations in the length of the liquid column in the stem of the flask with variations of suspended weight to control the operation of the drill stem.

3. A well-drilling system comprising, a drill stem, means for rotating the stem, hoisting means for lowering and hoisting the stem, in combination with, a weighing device disposed directly between the stem and the hoisting means, said weighing device including a pair of blocks placed so that a pair of surfaces are adjacent each other one of the blocks being hollowed out to form a chamber and having an aperture leading from the chamber, means to make the chamber liquid tight, means for subjecting the blocks to the weight of the stem in a direction substantially at right angles to the plane of the chamber whereby the internal volume of the chamber is changed with variations in load of the drill stem, and indicating means for indicating the amount of liquid extruded from the chamber by the weight of the stem.

4. In a rotary deep-well drilling system comprising, a drill stem, means for rotating the stem, and hoisting means for hoisting and lowering the stem, the combination of, a flask containing mercury, means for connecting the flask intermediate the stem and the hoisting means to be subjected to the suspended weight of the stem, and control means, responsive to the variations in volume of the flask with variations of suspended weight as indicated by the level of the mercury in the flask, to control the hoisting means.

5. In a rotary deep-well drilling system comprising a drill stem, means for rotating the drill stem, and hoisting means for hoisting and lowering the drill stem, the combination of, a flask containing mercury and a temperature compensating material, said material being so proportioned for a given temperature relative the volume of the metal flask and the volume of mercury at the said given temperature that the level of the mercury in the flask remains substantially fixed for a comparatively great temperature variation, means for connecting the flask intermediate the stem and the hoisting means to be thus subjected to the suspended weight of the drill stem, and control means responsive to the variations in volume of the flask with variations of the suspended weight as indicated by the level of the mercury in the flask, to control the hoisting means.

6. In a rotary deep-well drilling system comprising, a drill stem, means for rotating the drill stem, and hoisting means for hoisting and lowering the drill stem, the combination of, a flask having an opening, said flask being filled to a given level with a liquid, temperature compensating means in the liquid in the flask to maintain the liquid level in the flask constant even though the volume of the flask and the volume of the liquid may change with changes in temperature, means for subjecting the flask to the suspended weight of the drill stem, and control means responsive to the variations of liquid level in the flask to control the hoisting means.

7. In a weighing device for controlling the operation of a well-drilling system, the combination of a metal plate having a substantially plane surface, a second metal plate also substantially of the same size as the first and having a substantially plane surface, a bearing sill disposed near the edge of the plate and completely surrounding the plane surface of the second plate, means for joining the plates to form a closed chamber at the adjoining surfaces, said chamber containing a liquid, a tube extending from one of the plates having an aperture leading to the closed chamber, means for subjecting the plates to the suspended weight of the drill stem of the well-drilling system to vary the volume of the closed chamber, as a function of the suspended weight of the drill stem, and means responsive to the variations in length of the liquid in the aperture with variations in suspended weight.

8. In a weighing device for controlling the operation of a well-drilling system, the combination of, a substantially cylindrical base having a central depressed portion, a cap, having a tubular extension, fitting over the base to form a chamber containing mercury, said tubular extension communicating with said chamber, a rod disposed in the tube of the tubular extension, a loop of bare wire mounted on the rod, electrical conductors arranged as a Wheatstone bridge with said wire being connected in one leg of the bridge, a battery connected across two junctions of the bridge, a contact-making galvanometer connected across the other two junctions of the bridge, means for subjecting the cap to the suspended weight of the drill stem of the well-drilling system whereby mercury is caused to enter in the tubular extension to shunt lengths of said bare wire whereby the balanced condition of the Wheatstone bridge is disturbed as a function of the suspended weight of the drill stem, and means controlled by the galvanometer for controlling the vertical position, and thus the suspended weight, of the drill stem.

9. A well drilling system comprising, a drill stem, means for rotating the drill stem, and hoisting means for lowering and hoisting the drill stem to vary the unsuspended weight of the drill stem, in combination with, a weighing device and control system operatively interconnected with the weighing device, said weighing device comprising a receptacle containing mercury mounted to support the drill stem, a tube communicating with the receptacle, an invar member in the receptacle having a volume so proportioned with reference to the volume and temperature coefficient of the receptacle walls and the volume of mercury in the receptacle that the length of the mercury extending into the tube is not changed by changes in temperature of the receptacle but is changed only by the changes in the portion of the weight of the drill stem supported by the receptacle, and an indicating and controlling meter actuated by the variations of the length of mercury in the tube to control said hoisting means through said control system.

MORRIS STONE.
RENÉ BAUDRY.